US008771083B2

(12) United States Patent
Horneff et al.

(10) Patent No.: US 8,771,083 B2
(45) Date of Patent: Jul. 8, 2014

(54) APPARATUS AND METHOD OF ON-LINE REPORTING

(75) Inventors: Mark Andrew Horneff, London (GB);
Mark John Judge, London (GB);
Ronald Jonas Festejo, London (GB);
Mitchell Robert Jay Goodwin, London (GB); Stephen Peter Routledge, London (GB)

(73) Assignee: Sony Computer Entertainment Europe Limited (GB)

( * ) Notice: Subject to any disclaimer, the term of this patent is extended or adjusted under 35 U.S.C. 154(b) by 221 days.

(21) Appl. No.: 12/532,468

(22) PCT Filed: Sep. 5, 2008

(86) PCT No.: PCT/GB2008/003005
§ 371 (c)(1),
(2), (4) Date: Dec. 7, 2009

(87) PCT Pub. No.: WO2009/044095
PCT Pub. Date: Apr. 9, 2009

(65) Prior Publication Data
US 2010/0105484 A1    Apr. 29, 2010

(30) Foreign Application Priority Data

Oct. 3, 2007 (EP) ..................................... 07253914

(51) Int. Cl.
*A63F 13/00* (2014.01)
*A63F 9/24* (2006.01)
*A63F 13/10* (2006.01)
*A63F 13/12* (2006.01)

(52) U.S. Cl.
USPC .................................. 463/43; 463/1; 463/32

(58) Field of Classification Search
USPC ................................................. 463/1, 43, 32
See application file for complete search history.

(56) References Cited

U.S. PATENT DOCUMENTS 6,104,402 A * 8/2000 Goddard et al. ............... 345/419
6,486,908 B1 * 11/2002 Chen et al. ...................... 348/39
(Continued)

FOREIGN PATENT DOCUMENTS

JP  2001312745 A  11/2001
JP  2003281142 A  10/2003
JP  2007188310 A   7/2007

OTHER PUBLICATIONS

Anonymous "Second Life" Wikipedia, the Free Encyclopedia, Oct. 1, 2007.*

(Continued)

*Primary Examiner* — William H McCulloch, Jr.
(74) *Attorney, Agent, or Firm* — Lerner, David, Littenberg, Krumholz & Mentlik, LLP

(57) ABSTRACT

An entertainment device comprises a display generator arranged to generate for display a representation of an on-line virtual environment comprising one or more avatars corresponding to users of one or more remote entertainment devices each interacting with that online virtual environment, a network communicator operable to receive data representative of the actions of other users within the on-line virtual environment and to receive content sourced from one or more users of the one or more remote entertainment devices interacting with that online virtual environment, an input device operable by the user to instigate a reporting event and a content identifier operable to generate information indicative of content sourced from one or more users of the one or more remote entertainment devices and that was available to the entertainment device when the reporting event was instigated, and in which the network communicator is operable to transmit a report to a remote device comprising said generated information.

16 Claims, 16 Drawing Sheets

(56) References Cited

U.S. PATENT DOCUMENTS

| | | | |
|---|---|---|---|
| 6,798,923 B1* | 9/2004 | Hsieh et al. | 382/284 |
| 7,224,392 B2* | 5/2007 | Cahill et al. | 348/315 |
| 8,224,122 B2* | 7/2012 | Cohen et al. | 382/298 |
| 8,635,303 B2* | 1/2014 | Bhogal et al. | 709/217 |
| 2003/0216962 A1 | 11/2003 | Heller | |
| 2004/0143852 A1* | 7/2004 | Meyers | 725/133 |
| 2005/0086301 A1 | 4/2005 | Eichler et al. | |
| 2006/0148571 A1* | 7/2006 | Hossack et al. | 463/43 |
| 2006/0202427 A1* | 9/2006 | McDougal | 273/430 |
| 2006/0209194 A1* | 9/2006 | Liu et al. | 348/218.1 |
| 2006/0247060 A1* | 11/2006 | Hanson et al. | 463/42 |
| 2007/0211955 A1* | 9/2007 | Pan et al. | 382/254 |
| 2008/0282160 A1* | 11/2008 | Tonnison et al. | 715/704 |
| 2010/0062833 A1* | 3/2010 | Mattice et al. | 463/24 |
| 2010/0105484 A1* | 4/2010 | Horneff et al. | 463/43 |

OTHER PUBLICATIONS

Anonymous "Help:When and how to file an Abuse Report" Second Life Wiki, May 24, 2007.*

Anonymous "Panogames next gen screenshots for next gen games" Internet Article, Jun. 12, 2006.*

"Panogames—Most Viewed," Second Life entry, published May 2, 2006, accessed Oct. 31, 2012, 2 pages, <http://www.panogames.com/mostviewed/page3.htm>.*

"Panogames—Second Life," Media files 1 to 18, accessed Oct. 31, 2012, 4 pages, <http://www.panogames.com/second_life.htm>.*

Sarvas et al. "Metadata Creation System for Mobile Images." Copyright 2004. MobiSYS'04 Jun. 6-9, 2004, Boston, MA. 13 pp.*

International Search Report and Written Opinion dated Dec. 23, 2008 from the corresponding PCT/GB2008/003005.

Anonymous: "Second Life" Wikipedia, The Free Encyclopedia, [Online] Oct. 1, 2007, XP002487221 Retrieved from the Internet: URL:http://en.wikipedia.org/w/index.php?title-Second_Life &oldid=161720266&printable=yes> [retrieved on Jul. 7, 2008]; p. 1; "Chat" section; "Creation and copyright" section; "Asset storage" section; "Software" section; p. 1, paragraph 1.

Anonymous: "Help:When and how to file an Abuse Report" Second Line Wiki, [Online] May 24, 2007, XP002487222 Retrieved from the Internet: URL:http://web.archive.org/web/20070524040024/http://wiki.secondlife.com/wiki/Help:When_and_how_to_file_an_Abuse_Report> [retrieved on Jul. 7, 2008] cited in the application; "What to do" section.

Anonymous: "Panogames next genscreenshots for next gen games" Internet Article, [Online] Jun. 12, 2006, XP002487427 Retrieved from the Internet: URL:http://web.archive.org/web/20060612224402/http://www.panogames.com/> [retrieved on Jul. 8, 2008]; the whole document.

European Search Report dated Aug. 1, 2008 from EP07253914.

Japanese Office Action for Application No. 2010-186771 dated Oct. 5, 2012 , including English translation.

"Help: When and how to file an Abuse Report", [online], published May 24, 2007 [retrieved Jul. 17, 2013], internet<URL:http://web.archive.org/web/20070524040024/http://wiki.secondlife.com/wiki/Help:When_and_how_to_file_an_Abuse_Report>.

"Second Life: The Official Guide" Impress R&D, Jun. 21, 2007, first edition, third printing, p. 18-35, 333-339,342-350.

Japanese Office Action for Application No. 2010-527510 dated Jul. 23, 2013.

"Panogames", [online], published Jun. 12, 2006, [retrieved Nov. 13, 2013], internet <URL:http://web.archive.org/web/20060612224402/http://www.panogames.com/>.

* cited by examiner

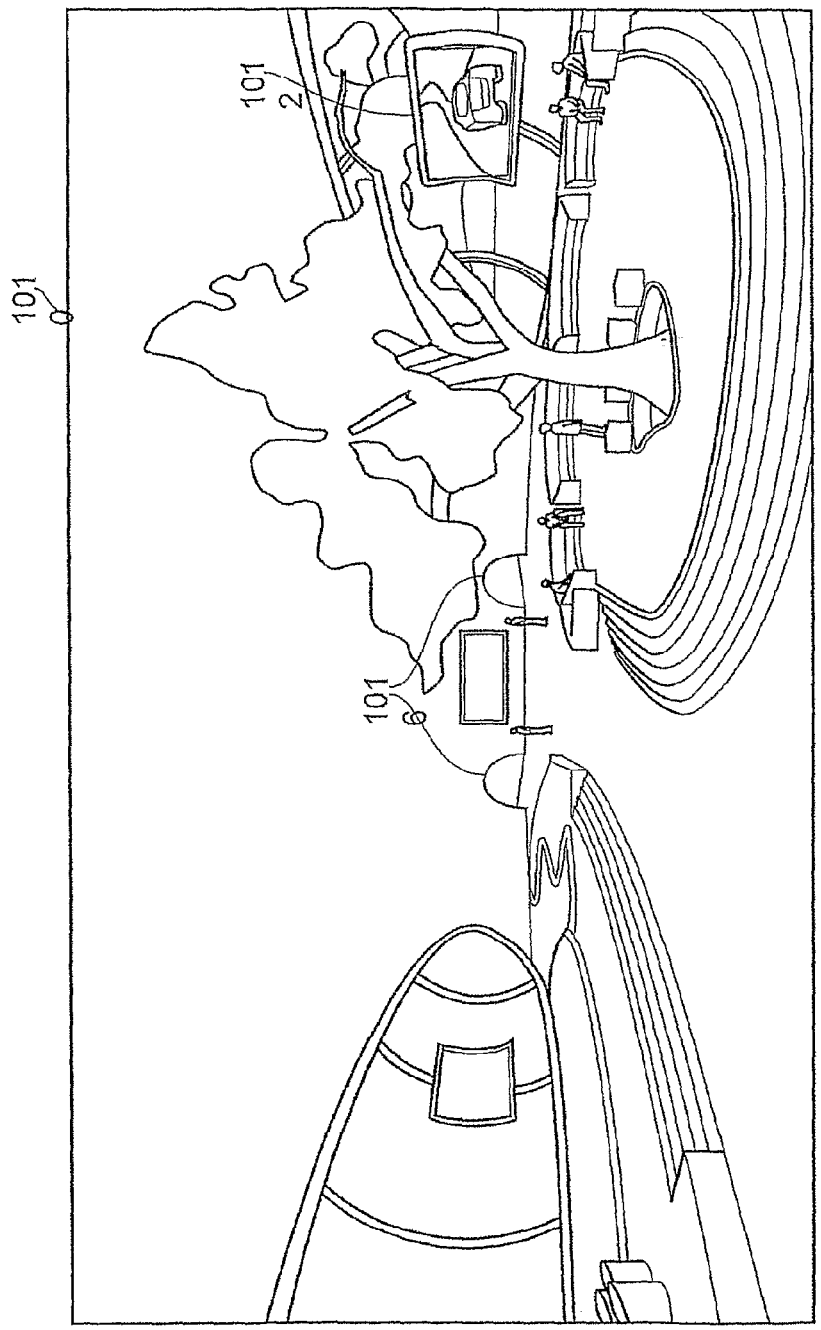

APPARATUS AND METHOD OF ON-LINE REPORTING

The present invention relates to an entertainment apparatus and method.

Some on-line games and more recently some on-line social environments such as Second Life (http://secondlife.com/) provide means by which users can report abusive or disruptive behaviour by other users. This takes the form of a so-called 'grief report'; an in-game or web-based form in which a user can identify an antisocial user and describe the events or behaviour that prompted them to file a grievance with the administrators of the environment or game. See for example https://wiki.secondlife.com/wiki/Help:When_and_how_to_file_an_Abuse_Report or http://reviews.ebay.com/How-to-Report-Abuse-in-Second-Life_W0QQugidZ10000000003846269.

Such reports are generally intended to identify antisocial users for the purposes of admonishing them or suspending or banning them from that particular game. However, as on-line games and social environments become more sophisticated, and more completely integrate with a user's own data, media and identity, there is a need to provide an improved grief reporting mechanism that can accommodate these abilities and could even potentially be used for civil action or criminal prosecution.

Embodiments of the present invention aim to address the above need.

In a first aspect of the present invention, an entertainment device comprises a display generator arranged to generate for display a representation of an on-line virtual environment comprising one or more avatars corresponding to users of one or more remote entertainment devices each interacting with that online virtual environment; a network communications arrangement operable to receive data representative of the actions of other users within the on-line virtual environment and to receive content sourced from one or more users of the one or more remote entertainment devices interacting with that online virtual environment; input means operable by the user to instigate a reporting event, and content identification means operable to generate information indicative of content sourced from one or more users of the one or more remote entertainment devices and that was available to the entertainment device when the reporting event was instigated, in which the network communications arrangement is operable to transmit a report to a remote device reporting the identified content.

In another aspect of the present invention, a method of on-line reporting comprises the steps of connecting to an online virtual environment and generating a representation of it for display to a user, receiving data representative of the actions of other users within the on-line virtual environment, receiving content sourced from one or more of the other users of the one or more remote entertainment devices interacting with that online virtual environment, instigating a reporting event, generating information indicative of content sourced from one or more of the other users of the one or more remote entertainment devices and that was available to the entertainment device when the reporting event was instigated, and transmitting to a remote device a report comprising said generated information.

Advantageously therefore, evidence of abuse in the form of user originated content can be incorporated within a grief report to administrators of an online environment.

Further respective aspects and features of the invention are defined in the appended claims.

Embodiments of the present invention will now be described by way of example with reference to the accompanying drawings, in which:

FIG. 6a is a schematic diagram of a lobby zone in accordance with an embodiment of the present invention;

An apparatus and method of on=line reporting are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, a user of an entertainment device has entered an on-line virtual environment. In that environment, the user encounters the avatar of another user that is wearing an offensive T-shirt. The user complains to the other user via a text window, and hears a torrent of abuse via a speech channel. The user can then press a button on their hand-held controller to instigate a grief report (or to enter a menu system where the instigation of a grief report is an option). Once the grief reporting process is instigated, the entertainment device conducts a forensic sweep of the virtual environment. In this sweep, content received from other users and cached within the entertainment device (including the texture defining the offensive T-shirt) is gathered for inclusion within the grief report as evidence. Other evidence gathering means may also be employed as part of the forensic sweep, such as including a log of text chat by the user, an audio/video record of the user's viewpoint for the last two minutes (for example), identifiers for each avatar encountered within that period, and/or a 360 degree snapshot of the virtual environment centred upon the user's position within it. These records are then appended to a grief report, in which the user may include their own impressions of the event in a conventional manner.

In this way, genuinely offensive or illegal material introduced into the virtual environment by another user can be accurately and verifiably reported, whilst simultaneously limiting the ability of users to abuse the grief reporting system in order to get others banned for frivolous or baseless reasons.

In an embodiment of the present invention, the entertainment device is a Sony® Playstation 3® (PS3®).

Figure 1:
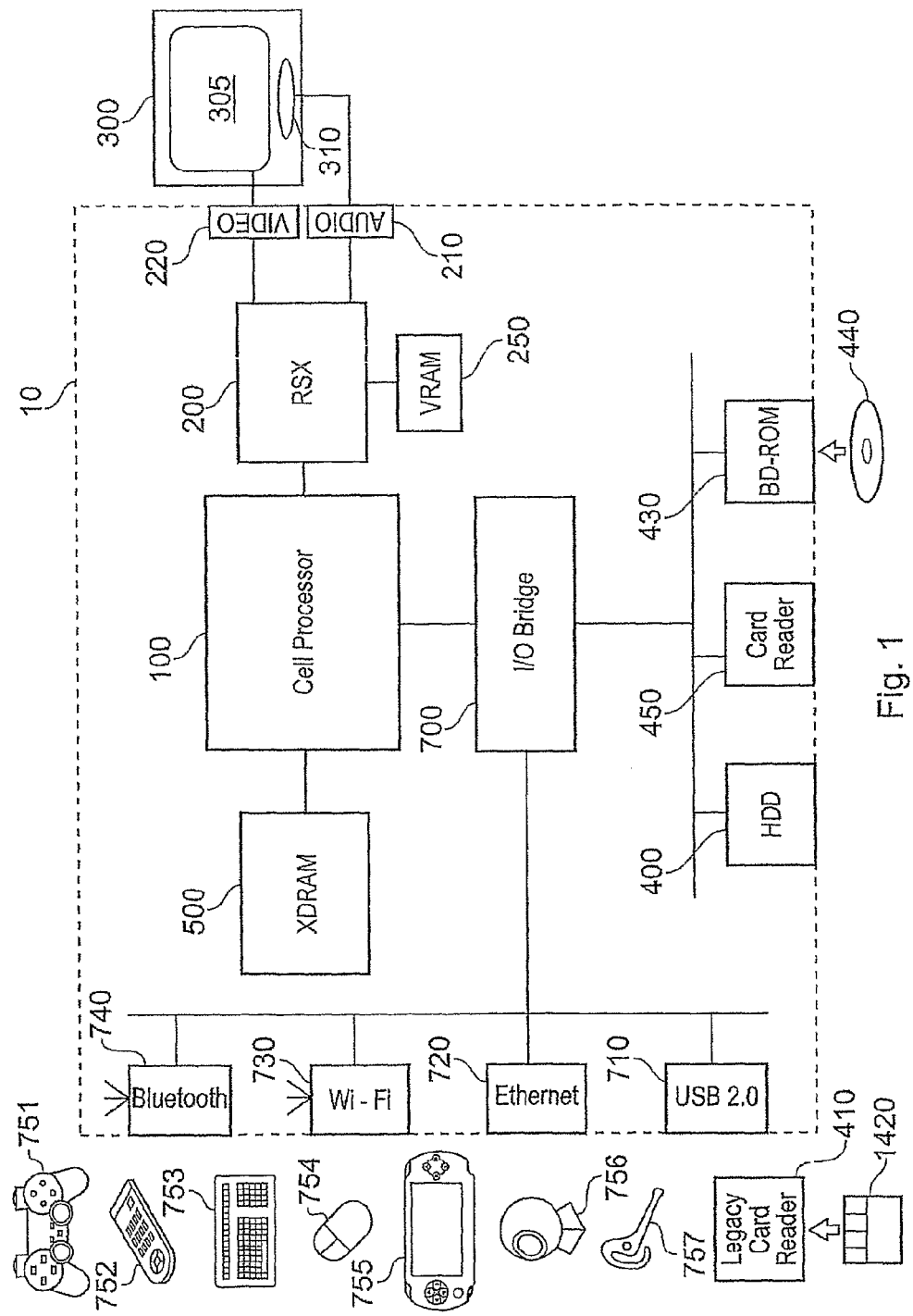
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
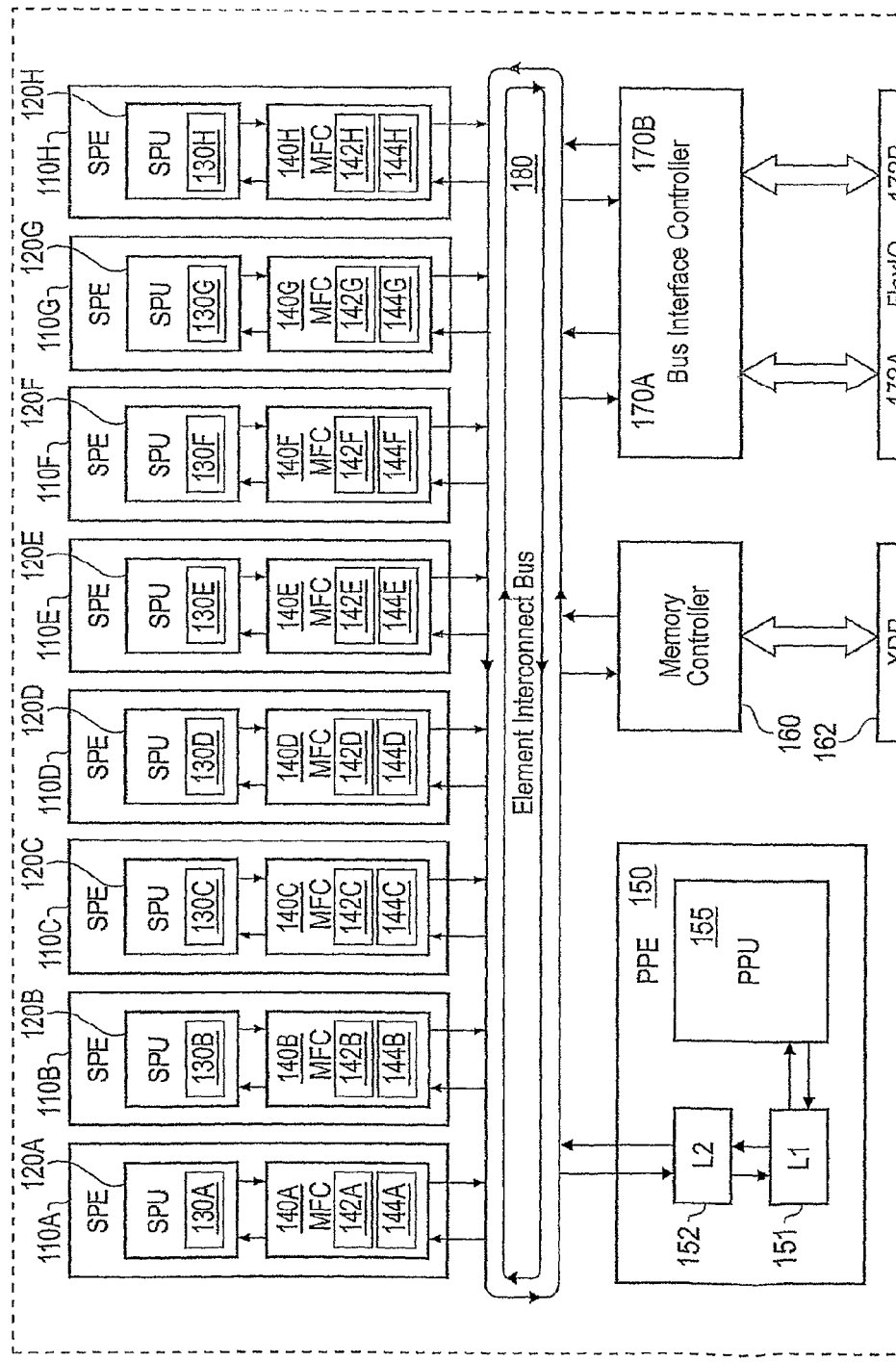
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
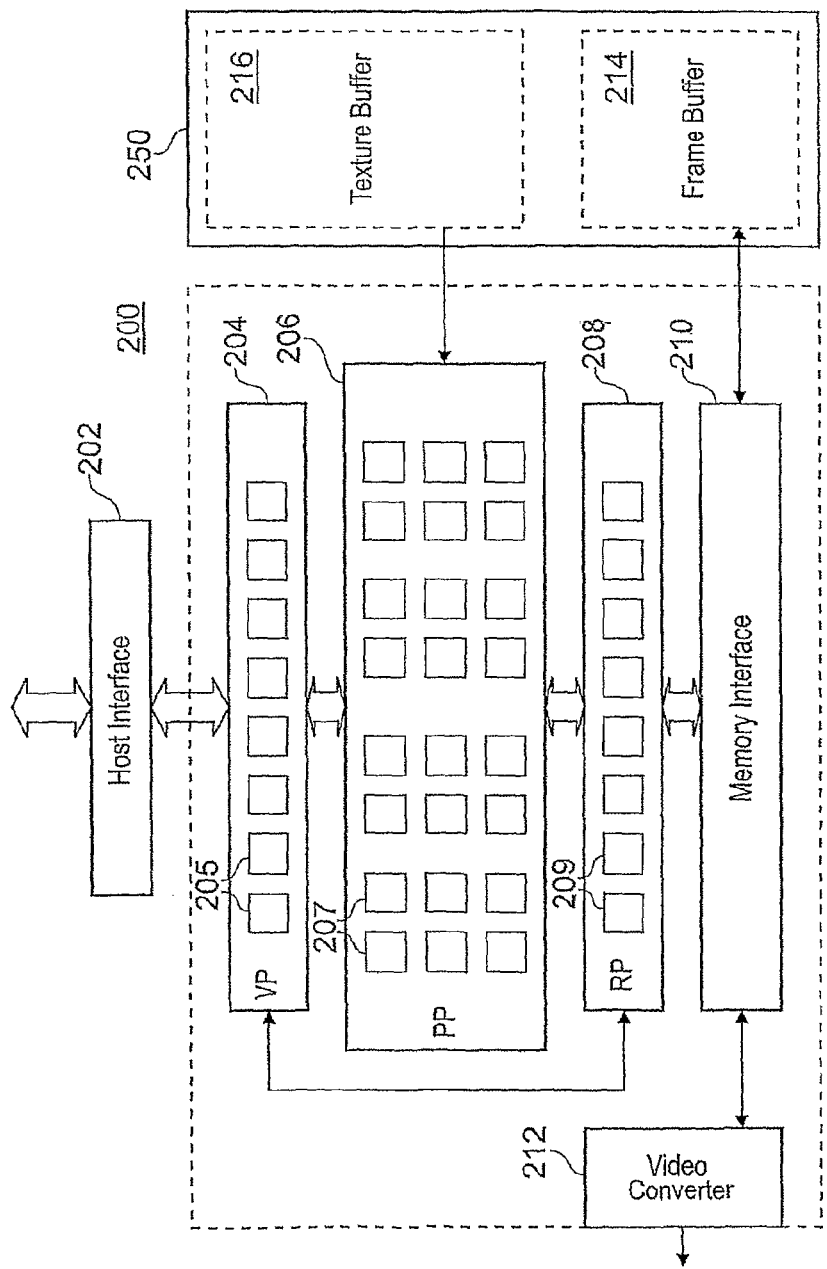
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

In an embodiment of the present invention, the above-mentioned online capability comprises interaction with a virtual environment populated by avatars (graphical representations) of the user of the PS3 10 and of other PS3 users who are currently online.

The software to enable the virtual interactive environment is typically resident on the HDD 400, and can be upgraded and/or expanded by software that is downloaded, or stored on optical disk 440, or accessed by any other suitable means. Alternatively, the software may reside on a flash memory card 420, optical disk 440 or a central server (not shown).

In an embodiment of the present invention, the virtual interactive environment (hereafter called the 'Home' environment) is selected from the cross-media bar. The Home environment then starts in a conventional manner similar to a 3D video game by loading and executing control software, loading 3D models and textures into video memory 250, and rendering scenes depicting the Home environment. Alternatively or in addition, the Home environment can be initiated by other programs, such as a separate game.

Figure 4:
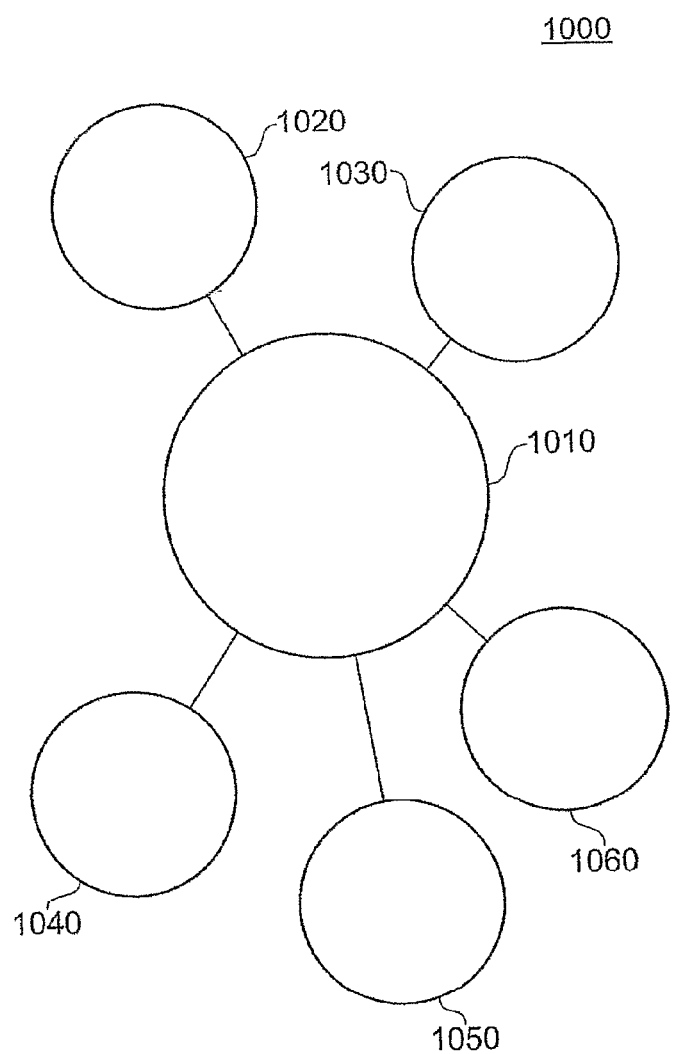
FIG. 4 is a schematic diagram of an interconnected set of game zones in accordance with an embodiment of the present invention.
Figure 5:
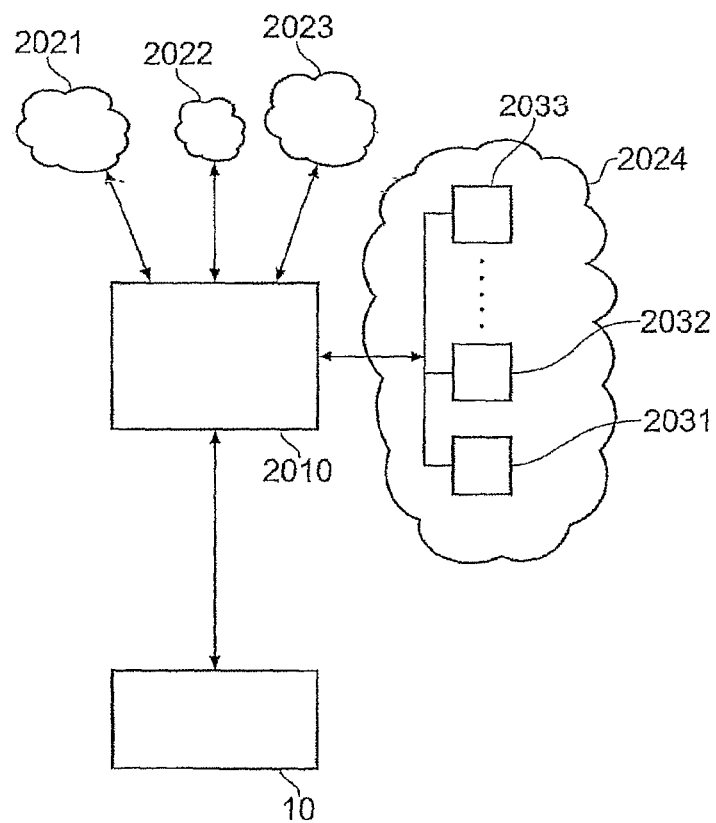
FIG. 5 is a schematic diagram of a Home environment online client/server arrangement in accordance with an embodiment of the present invention.

Referring now to FIG. 4, which displays a notional map of the Home environment, and FIG. 5, which is a schematic diagram of a Home environment online client/server arrangement, the user's avatar is spawned within a lobby zone 1010 by default. However, a user can select among other zones 1010-1060 (detailed below) of the map, causing the select zone to be loaded and the avatar to be spawned within that zone. In an embodiment of the present invention, the map screen further comprises a sidebar on which the available zones may be listed, together with management tools such as a ranking option, enabling zones to be listed in order of user preference, or such as most recently added and/or A-Z listings. In addition a search interface may allow the user to search for a zone by name. In an embodiment of the present invention, there maybe many more zones available than are locally stored on the user's PS3 at any one time; the local availability may be colour coded on the list, or the list may be filtered to only display locally available zones. If the user selects a locally unavailable zone, it can be downloaded from a Home environment Server 2010.

Referring now to FIG. 6a, the lobby zone 1010 typically resembles a covered piazza, and may comprise parkland (grass, trees, sculptures etc.), and gathering spaces (such as open areas, single benches or rows of seats etc.) where users can meet through their avatars.

The lobby zone 1010 typically also comprises advertisement hoardings, for displaying either still or moving adverts for games or other content or products. These may be on the walls of the lobby, or may stand alone.

The lobby zone 1010 may also include an open-air cinema 1012 showing trailers, high-profile adverts or other content from third-party providers. Such content is typically streamed or downloaded from a Home environment server 2010 to which the PS3 10 connects when the Home environment is loaded, as described in more detail later.

The cinema screen is accompanied by seating for avatars in front of it, such that when an avatar sits down, the camera angle perceived by the user of the avatar also encompasses the screen.

Figure 6B:
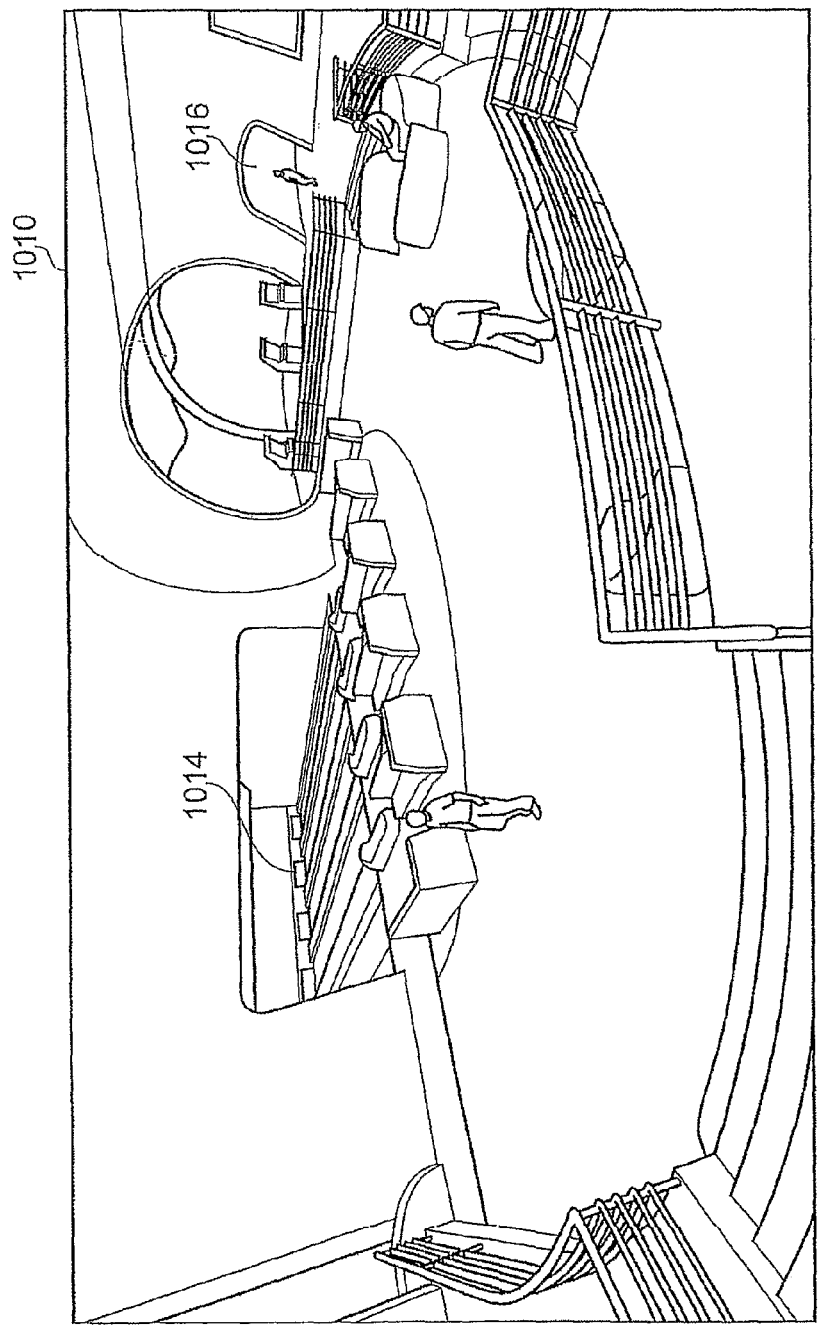
FIG. 6b is a schematic diagram of a lobby zone in accordance with an embodiment of the present invention.

Referring now also to FIG. 6*b*, the lobby zone 1010 may also include general amusements 1014, such as functioning pool tables, bowling alleys, and/or a video arcade. Games of pool or bowling may be conducted via the avatar, such that the avatar holds the pool cue or bowling ball, and is controlled in a conventional manner for such games. In the video arcade, if an avatar approaches a videogame machine, the home environment may switch to a substantially full-screen representation of the videogame selected. Such games may, for example, be classic arcade or console games such as Space Invaders®, or Pac-Man®, which are comparatively small in terms of memory and processing and can be emulated by the PS3 within the Home environment or run as plug-ins to the Home environment. In this case, typically the user will control the game directly, without representation by the avatar. The game will switch back to the default Home environment view if the user quits the game, or causes the avatar to move away from the videogame machine. In addition to classic arcade games, user-created game content may be featured on one or more of the virtual video game machines. Such content may be the subject of on-line competitions to be featured in such a manner, with new winning content downloaded on a regular basis.

In addition to the lobby zone 1010, other zones (e.g. zones 1020, 1030, 1040, 1050 and 1060, which may be rooms, areas or other constructs) are available. These may be accessed either via a map screen similar in nature to that of FIG. 4, or alternatively the user can walk to these other areas by guiding their avatar to various exits 1016 from the lobby.

Typically, an exit 1016 takes the form of a tunnel or corridor (but may equally take the form of an anteroom) to the next area. While the avatar is within the tunnel or anteroom, the next zone is loaded into memory. Both the lobby and the next zone contain identical models of the tunnel or anteroom, or the model is a common resource to both. In either case, the user's avatar is relocated from the lobby-based version to the new zone-based version of the tunnel or anteroom at the same position. In this way the user's avatar can apparently walk seamlessly throughout the Home environment, without the need to retain the whole environment in memory at the same time.

Figure 6C:
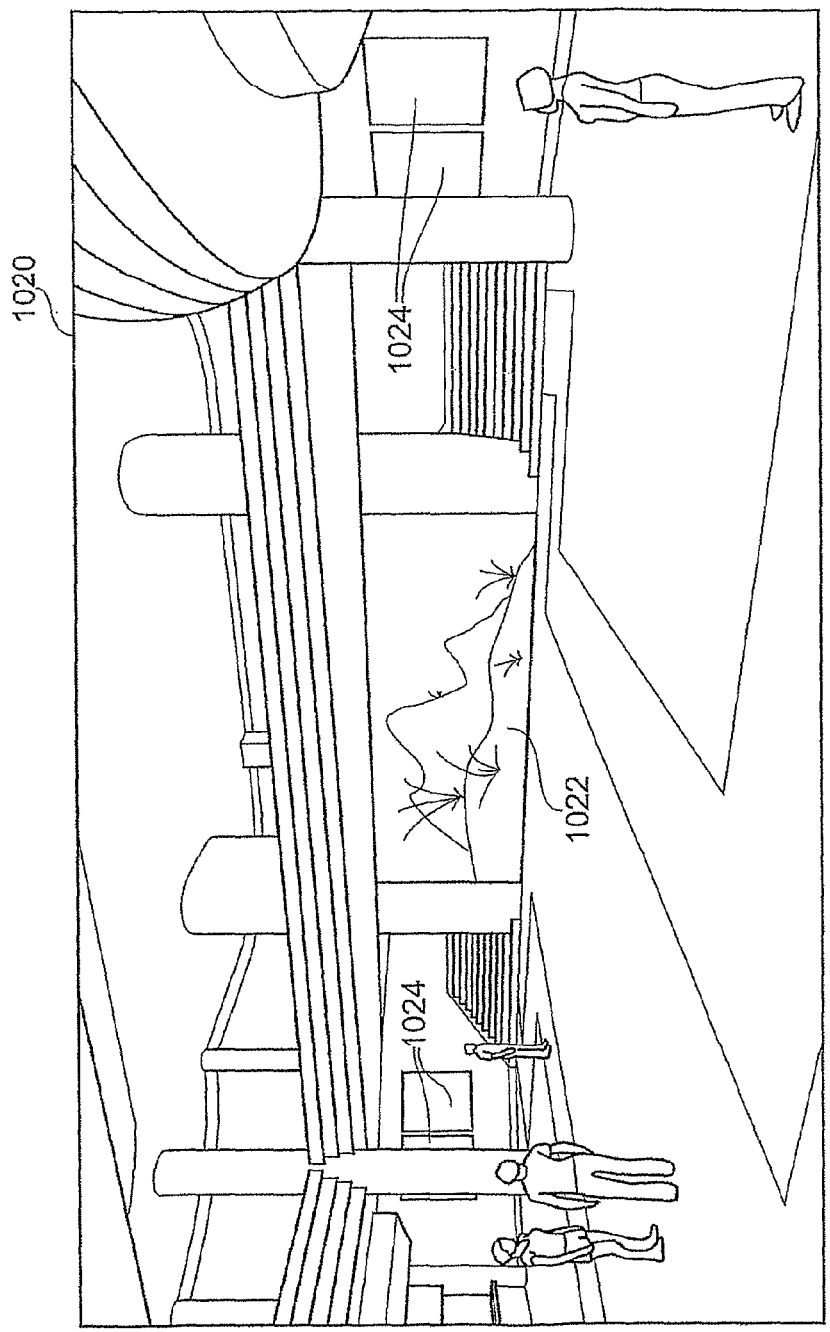
FIG. 6c is a schematic diagram of a cinema zone in accordance with an embodiment of the present invention.

Referring now also to FIG. 6*c*, one available zone is a Cinema zone 1020. The Cinema zone 1020 resembles a multiplex cinema, comprising a plurality of screens that may show content such as trailers, movies, TV programmes, or adverts downloaded or streamed from a Home environment server 2010 as noted previously and detailed below, or may show content stored on the HDD 400 or on an optical disk 440, such as a Blu-Ray disk.

Typically, the multiplex cinema will have an entrance area featuring a screen 1022 on which high-profile trailers and adverts may be shown to all visitors, together with poster adverts 1024, typically but not limited to featuring upcoming movies. Specific screens and the selection and display of the trailers and posters can each be restricted according to the age of the user, as registered with the PS3. This age restriction can be applied to any displayed content to which an age restriction tag is associated, in any of the zones within the Home environment.

In addition, in an embodiment of the present invention the multiplex cinema provides a number of screen rooms in which featured content is available, and amongst which the user can select. Within a screen room downloaded, streamed or locally stored media can be played within a virtual cinema environment, in which the screen is set in a room with rows of seats, screen curtains, etc. The cinema is potentially available to all users in the Home environment, and so the avatars of other users may also be visible, for example watching commonly streamed material such as a web broadcast. Alternatively, the user can zoom in so that the screen occupies the full viewing area.

Figure 6D:
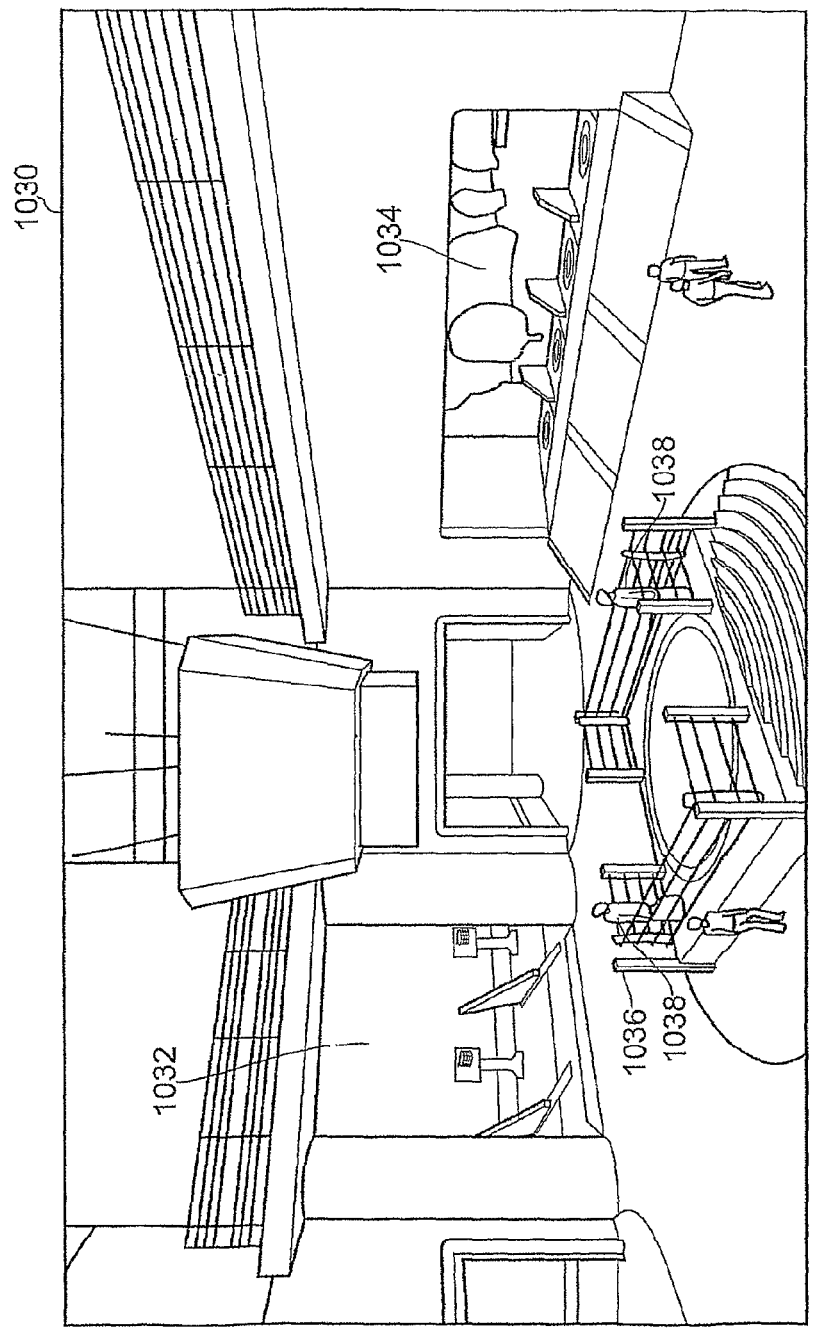
FIG. 6d is a schematic diagram of a developer/publisher zone in accordance with an embodiment of the present invention.

Referring now also to FIG. 6*d*, another type of zone is a developer or publisher zone 1030. Typically, there may be a plurality of such zones available. Optionally, each may have its own exit from the lobby area 1010, or alternatively some or all may share an exit from the lobby and then have separate exits from within a tunnel or ante-room model common to or replicated by each available zone therein. Alternatively they may be selected from a menu, either in the form of a pop-up menu, or from within the Home environment, such as by selecting from a set of signposts. In these latter cases the connecting tunnel or anteroom will appear to link only to the selected developer or publisher zone 1030. Alternatively or in addition, such zones may be selected via the map screen, resulting in the zone being loaded in to memory, and the avatar re-spawning within the selected zone.

Developer or publisher zones 1030 provide additional virtual environments, which may reflect the look and feel of the developer or publisher's products, brands and marks. The developer or publisher zones 1030 are supplementary software modules to the Home environment and typically comprise additional 3D models and textures to provide the structure and appearance of the zone.

In addition, the software operable to implement the Home environment supports the integration of third party software via an application program interface (API). Therefore, developers can integrate their own functional content within the Home environment of their own zone. This may take the form of any or all of:

i. Downloading/streaming of specific content, such as game trailers or celebrity endorsements;

ii. Changes in avatar appearance, behaviour and/or communication options within the zone;

iii. The provision of one or more games, such as basketball 1032 or a golf range 1034, optionally branded or graphically reminiscent of the developer's or publisher's games;

iv. One or more interactive scenes or vignettes representative of the developer's or publisher's games, enabling the player to experience an aspect of the game, hone a specific skill of the game, or familiarise themselves with the controls of a game;

v. An arena, ring, dojo, court or similar area 1036 in which remotely played games may be represented live by avatars 1038, for spectators to watch.

Thus, for example, a developer's zone resembles a concourse in the developer's signature colours and featuring their logos, onto which open gaming areas, such as soccer nets, or a skeet range for shooting. In addition, a booth (not shown) manned by game-specific characters allows the user's avatar to enter and either temporarily change into the lead character of the game, or zoom into a first person perspective, and enter a further room resembling a scene from the featured game. Here the user interacts with other characters from the game, and plays out a key scene. Returning to the concourse, adverts for the game and other content are displayed on the walls. At the end of the zone, the concourse opens up into an arena where a 5-a-side football match is being played, where the positions of the players and the ball correspond to a game currently being played by a popular group, such as a high-ranking game clan, in another country.

In embodiments of the present invention, developer/publisher zones are available to download. Alternatively or in addition, to reduce bandwidth they may be supplied as demo content on magazine disks, or may be installed/upgraded from disk as part of the installation process for a purchased game of the developer or publisher. In the latter two examples, subsequent purchase or registration of the game may result in further zone content being unlocked or downloaded. In any event, further modifications, and timely advert and trailer media, may be downloaded as required.

A similar zone is the commercial zone 1040. Again, there may be a plurality of such commercial zones accessible in similar manner to the developer and publisher zones. Like developer/publisher zones 1030, commercial zones 1040 may comprise representative virtual assets of one or more commercial vendors in the form of 3D models, textures etc., enabling a rendering of their real-world shops, brands and identities, and these may be geographically and/or thematically grouped within zones.

Space within commercial zones may be rented as so-called 'virtual real-estate' by third parties. For example, a retailer may pay to have a rendering of their shop included within a commercial zone 1040 as part of a periodic update of the Home environment supplied via the Home environment server 2010, for example on a monthly or annual renewal basis. A retailer may additionally pay for the commerce facilities described above, either on a periodic basis or per item. In this way they can provide users of the Home environment with a commercial presence.

Again, the commercial zone comprises supplementary software that can integrate with the home environment via an API, to provide additional communication options (shop-specific names, goods, transaction options etc), and additional functionality, such as accessing an online database of goods and services for purchase, determining current prices, the availability of goods, and delivery options. Such functions may be accessed either via a menu (either as a pop-up or within the Home environment, for example on a wall) or via communication with automated avatars. Communication between avatars is described in more detail later.

It will be appreciated that developers and publishers can also provide stores within commercial zones, and in addition that connecting tunnels between developer/publisher and commercial zones may be provided. For example, a tunnel may link a developer zone to a store that sells the developer's games. Such a tunnel may be of a 'many to one' variety, such that exits from several zones emerge from the same tunnel in-store. In this case, if re-used, typically the tunnel would be arranged to return the user to the previous zone rather than one of the possible others.

In an embodiment of the present invention, the software implementing the Home environment has access to an online-content purchase system provided by the PS3 OS.

Developers, publishers and store owners can use this system via an interface to specify the IP address and query text that facilitates their own on-line transaction. Alternatively, the user can allow their PS3 registration details and credit card details to be used directly, such that by selecting a suitably enabled object, game, advert, trailer or movie anywhere within the Home environment, they can select to purchase that item or service. In particular, the Home environment server 2010 can store and optionally validate the user's credit card and other details so that the details are ready to be used in a transaction without the user having to enter them. In this way the Home environment acts as an intermediary in the transaction. Alternatively such details can be stored at the PS3 and validated either by the PS3 or by the Home environment server.

Figure 7:
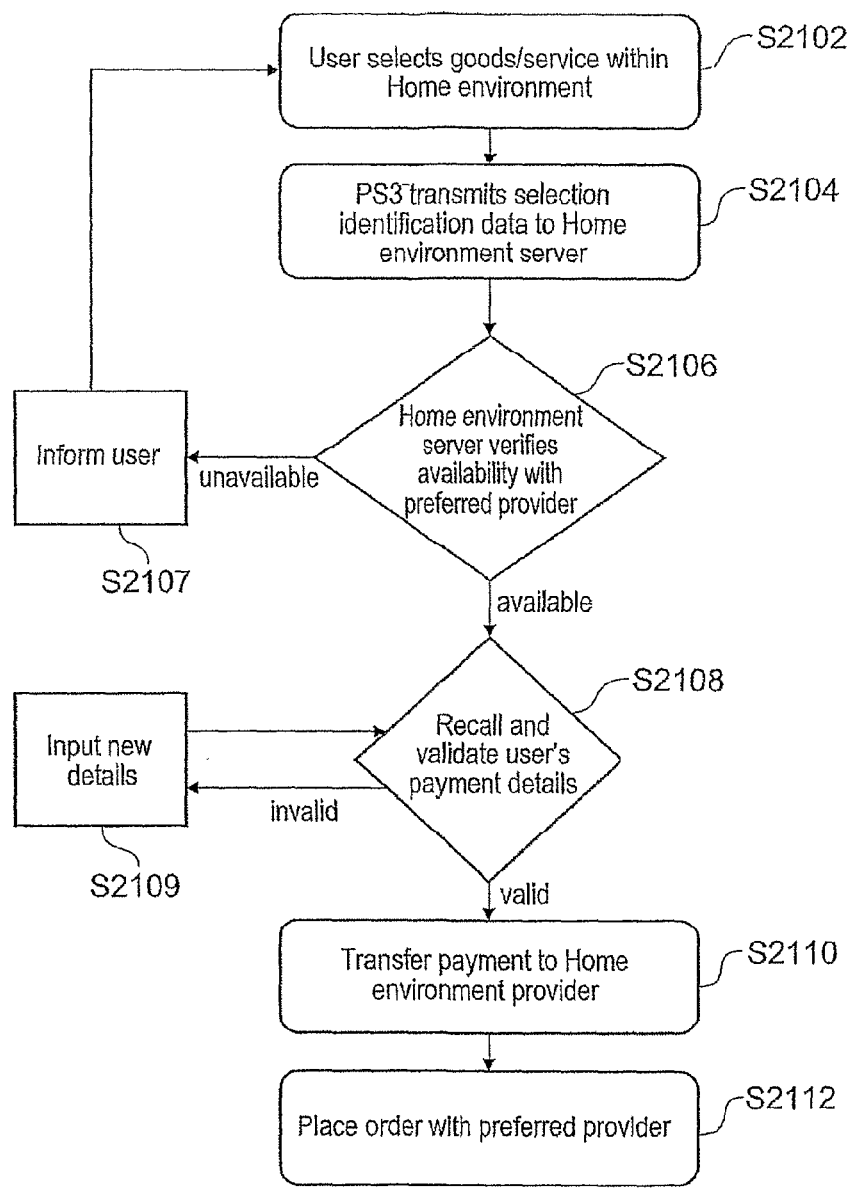
FIG. 7 is a flow diagram of a method of on-line transaction in accordance with an embodiment of the present invention.

Thus, referring now also to FIG. 7, in an embodiment of the present invention a method of sale comprises in a step s2102 a user selecting an item (goods or a service) within the Home environment. In step s2104, the PS3 10 transmits identification data corresponding with the object to the Home environment server 2010, which in step s2016 verifies the item's availability from a preferred provider (preferably within the country corresponding to the IP address of the user). If the item is unavailable then in step s2107 it informs the user by transmitting a message to the user's PS3 10. Alternatively, it first checks for availability from one or more secondary providers, and optionally confirms whether supply from one of these providers is acceptable to the user. In step s2108, the Home environment server retrieves from data storage the user's registered payment details and validates them. If there is no valid payment method available, then the Home environment may request that the user enters new details via a secure (i.e. encrypted) connection. Once a valid payment method is available, then in step s2110 the Home environment server requests from the appropriate third party payment provider a transfer of payment from the user's account. Finally, in s2112 the Home environment server places an order for the item with the preferred provider, giving the user's delivery address or IP address as applicable, and transferring appropriate payment to the preferred provider's account.

In this way, commerce is not limited specifically to shops. Similarly, it is not necessary for shops to provide their own commerce applications if the preferred provider for goods or services when displayed within a shop is set to be that shop's owner. Where the goods or service may be digitally provided, then optionally it is downloaded from the preferred provider directly or via a Home environment server 2010.

In addition to the above public zones, there are additional zones that are private to the individual user and may only be accessed by them or by invitation from them. These zones also have exits from the communal lobby area, but when entered by the avatar (or chosen via the map screen), load a respective version of the zone that is private to that user.

Figure 8A:
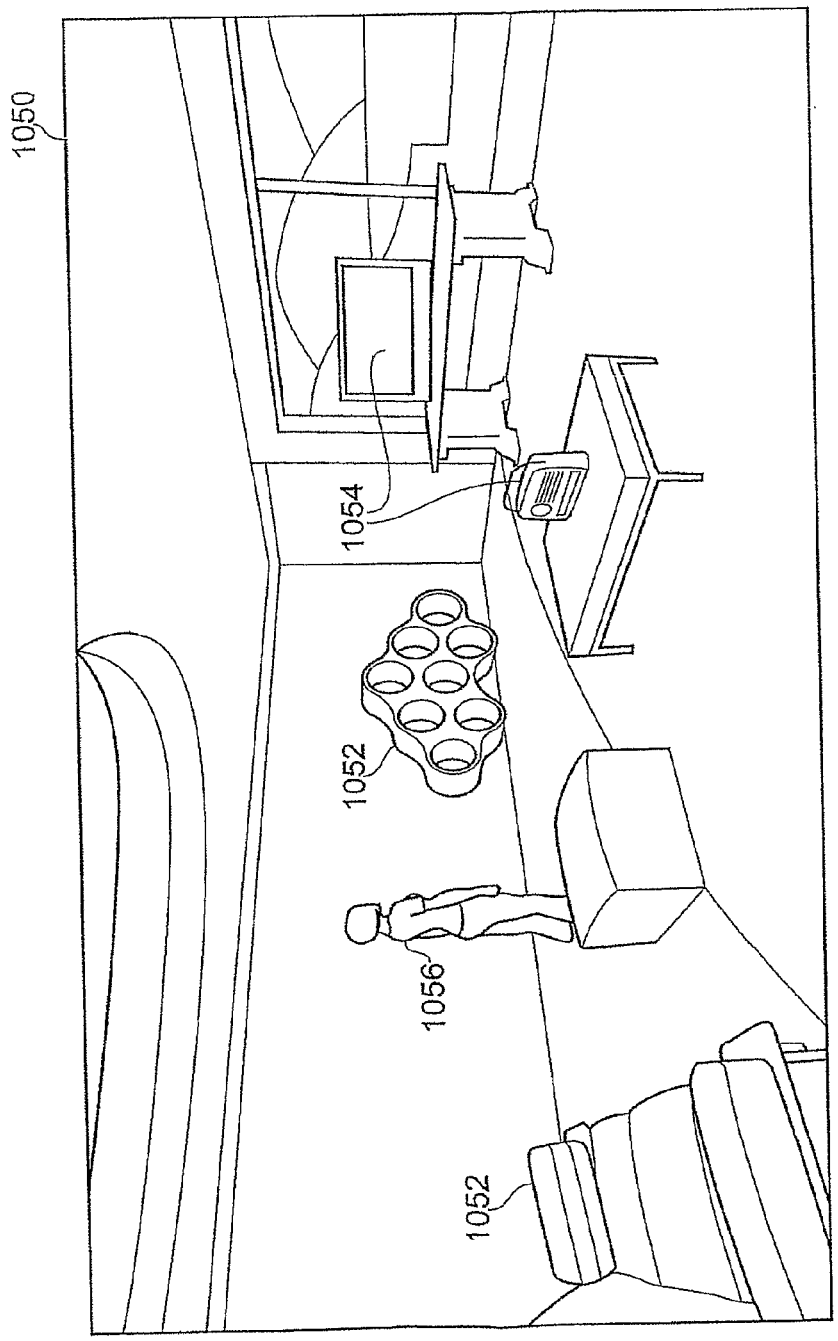
FIG. 8a is schematic diagram of an apartment zone in accordance with an embodiment of the present invention.

Referring to FIG. 8a, the first of these zones is an apartment zone 1050. In an embodiment of the present invention, this is a user-customisable zone in which such features 1052 as wallpaper, flooring, pictures, furniture, outside scenery and lighting may be selected and positioned. Some of the furniture is functional furniture 1054, linked to PS3 functionality. For example, a television may be placed in the apartment 1050 on which can be viewed one of several streamed video broadcasts, or media stored on the PS3 HDD 400 or optical disk 440. Similarly, a radio or hi-fi may be selected that contains pre-selected links to internet radio streams. In addition, user artwork or photos may be imported into the room in the form of wall hangings and pictures.

Optionally, the user (represented in FIG. 8a by their avatar 1056) may purchase a larger apartment, and/or additional goods such as a larger TV, a pool table, or automated non-player avatars. Other possible items include a gym, swimming pool, or disco area. In these latter cases, additional control software or configuration libraries to provide additional character functionality will integrate with the home environment via the API in a similar fashion to that described for the commercial and developer/publisher zones 1030, 1040 described previously.

Such purchases may be made using credit card details registered with the Home environment server. In return for a payment, the server downloads an authorisation key to unlock the relevant item for use within the user's apartment. Alternatively, the 3D model, textures and any software associated with an item may also be downloaded from the Home environment server or an authorised third-party server, optionally again associated with an authorisation key. The key may, for example, require correspondence with a firmware digital serial number of the PS3 10, thereby preventing unauthorised distribution.

A user's apartment can only be accessed by others upon invitation from the respective user. This invitation can take the form of a standing invitation for particular friends from within a friends list, or in the form of a single-session pass conferred on another user, and only valid whilst that user remains in the current Home environment session. Such invitations may take the form of an association maintained by a Home environment server 2010, or a digital key supplied between PS3 devices on a peer-to-peer basis that enables confirmation of status as an invitee.

In an embodiment of the present invention invited users can only enter the apartment when the apartment's user is present within the apartment, and are automatically returned to the lobby if the apartment's user leaves. Whilst within the apartment, all communication between the parties present (both user and positional data) is purely peer-to-peer.

The apartment thus also provides a user with the opportunity to share home created content such as artwork, slideshows, audio or video with invited guests, and also to interact with friends without potential interference from other users within the public zones.

When invited guests enter a user's apartment, the configuration of the room and the furnishings within it are transmitted in a peer-to-peer fashion between the attendees using ID codes for each object and positional data. Where a room or item are not held in common between the user and a guest, the model, textures and any code required to implement it on the guest's PS3 may also be transmitted, together with a single-use key or similar constraint, such as use only whilst in the user's apartment and whilst the user and guest remain online in this session.

Figure 8B:
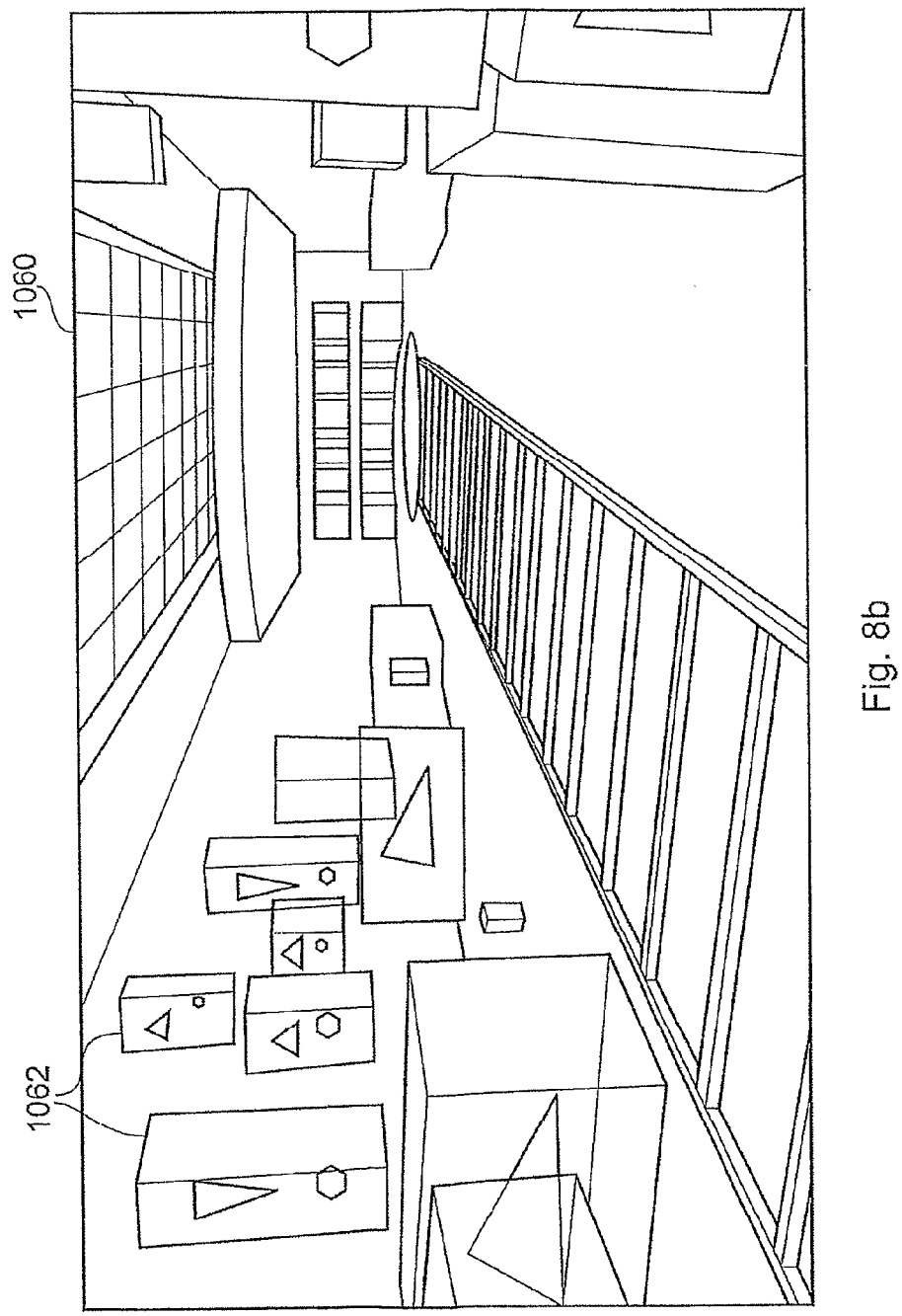
FIG. 8b is schematic diagram of a trophy room zone in accordance with an embodiment of the present invention.

Referring to FIG. 8b, a further private space that may similarly be accessed only by invitation is the user's Trophy Room 1060. The Trophy Room 1060 provides a space within which trophies 1062 earned during game play may be displayed.

For example, a third-party game comprises seeking a magical crystal. If the player succeeds in finding the crystal, the third party game nominates this as a trophy for the Trophy Room 1060, and places a 3D model and texture representative of the crystal in a file area accessed by the Home environment software when loading the Trophy Room 1060. The software implementing the Home environment can then render the crystal as a trophy within the Trophy Room.

When parties are invited to view a user's trophy room, the models and textures required to temporarily view the trophies are sent from the user's PS3 to those of the other parties on a peer-to-peer basis. This may be done as a background activity following the initial invitation, in anticipation of entering the trophy room, or may occur when parties enter a connecting tunnel/anteroom or select the user's trophy room from the map screen. Optionally, where another party also has that trophy, they will not download the corresponding trophy from the user they are visiting. Therefore, in an embodiment of the present invention, each trophy comprises an identifying code.

Alternatively or in addition, a trophy room may be shared between members of a group or so-called 'clan', such that a trophy won by any member of the clan is transmitted to other members of the clan on a peer-to-peer basis. Therefore all members of the clan will see a common set of trophies.

Alternatively or in addition, a user can have a standing invitation to all members of the Home environment, allowing anyone to visit their trophy room. As with the commercial and developer/publisher zones, a plurality of rooms is therefore possible, for example a private, a group-based and a public trophy room. This may be managed either by selection from a pop-up menu or signposts within the Home environment as described previously, or by identifying a relevant user by walking up to their avatar, and then selecting to enter their (public) trophy room upon using the trophy room exit from the lobby.

Alternatively or in addition, a public trophy room may be provided. This room may display the trophies of the person in the current instance of the Home environment who has the most trophies or a best overall score according to a trophy value scoring scheme. Alternatively it may be an aggregate trophy room, showing the best, or a selection of, trophies from some or all of the users in that instance of the Home environment, together with the ID of the user. Thus, for example, a user could spot a trophy from a game they are having difficulty with, identify who in the Home environment won it, and then go and talk to them about how they won it. Alternatively, a public trophy room could contain the best trophies across a plurality of Home environments, identifying the best garners within a geographical, age specific or game specific group, or even worldwide. Alternatively or in addition, a leader board of the best scoring garners can be provided and updated live.

It will be appreciated that potentially a large number of additional third party zones may become available, each comprising additional 3D models, textures and control software. As a result a significant amount of space on HDD 400 may become occupied by Home environment zones.

Consequently, in an embodiment of the present invention the number of third party zones currently associated with a user's Home environment can be limited. In a first instance, a maximum memory allocation can be used to prevent additional third party zones being added until an existing one is deleted. Alternatively or in addition, third party zones may be limited according to geographical relevance or user interests (declared on registration or subsequently via an interface with the Home environment server 2010), such that only third party zones relevant to the user by these criteria are downloaded. Under such a system, if a new third party zone becomes available, its relevance to the user is evaluated according to the above criteria, and if it is more relevant than at least one of those currently stored, it replaces the currently least relevant third party zone stored on the user's PS3.

Other criteria for relevance may include interests or installed zones of nominated friends, or the relevance of zones to games or other media that have been played on the user's PS3.

Further zones may be admitted according to whether the user explicitly installs them, either by download or by disk.

As noted above, within the Home environment users are represented by avatars. The software implementing the Home environment enables the customisation of a user's avatar from a selection of pre-set options in a similar manner to the customisation of the user's apartment. The user may select gender and skin tone, and customise the facial features and hair by combining available options for each. The user may also select from a wide range of clothing. To support this facility, a wide range of 3D models and textures for avatars are provided. In an embodiment of the present invention, user may import their own textures to display on their clothing. Typically, the parameters defining the appearance of each avatar only occupy around 40 bytes, enabling fast distribution via the home server when joining a populated Home environment.

Each avatar in the home environment can be identified by the user's ID or nickname, displayed in a bubble above the avatar. To limit the proliferation of bubbles, these fade into view when the avatar is close enough that the text it contains could easily be read, or alternatively when the avatar is close enough to interact with and/or is close to the centre of the user's viewpoint.

The avatar is controlled by the user in a conventional third-person gaming manner (e.g. using the game controller 751), allowing them to walk around the Home environment. Some avatar behaviour is contextual; thus for example the option to sit down will only be available when the avatar is close to a seat. Other avatar behaviour is available at all times, such as for example the expression of a selected emotion or gesture, or certain communication options. Avatar actions are determined by use of the game controller 751, either directly for actions such as movement, or by the selection of actions via a pop-up menu, summoned by pressing an appropriate key on the game controller 751.

Options available via such a menu include further modification of the avatar's appearance and clothing, and the selection of emotions, gestures and movements. For example, the user can select that their avatar smiles, waves and jumps up and down when the user sees someone they know in the Home environment.

Users can also communicate with each other via their avatars using text or speech.

To communicate by text, in an embodiment of the present invention, messages appear in pop-up bubbles above the relevant avatar, replacing their name bubble if necessary.

Figure 9:
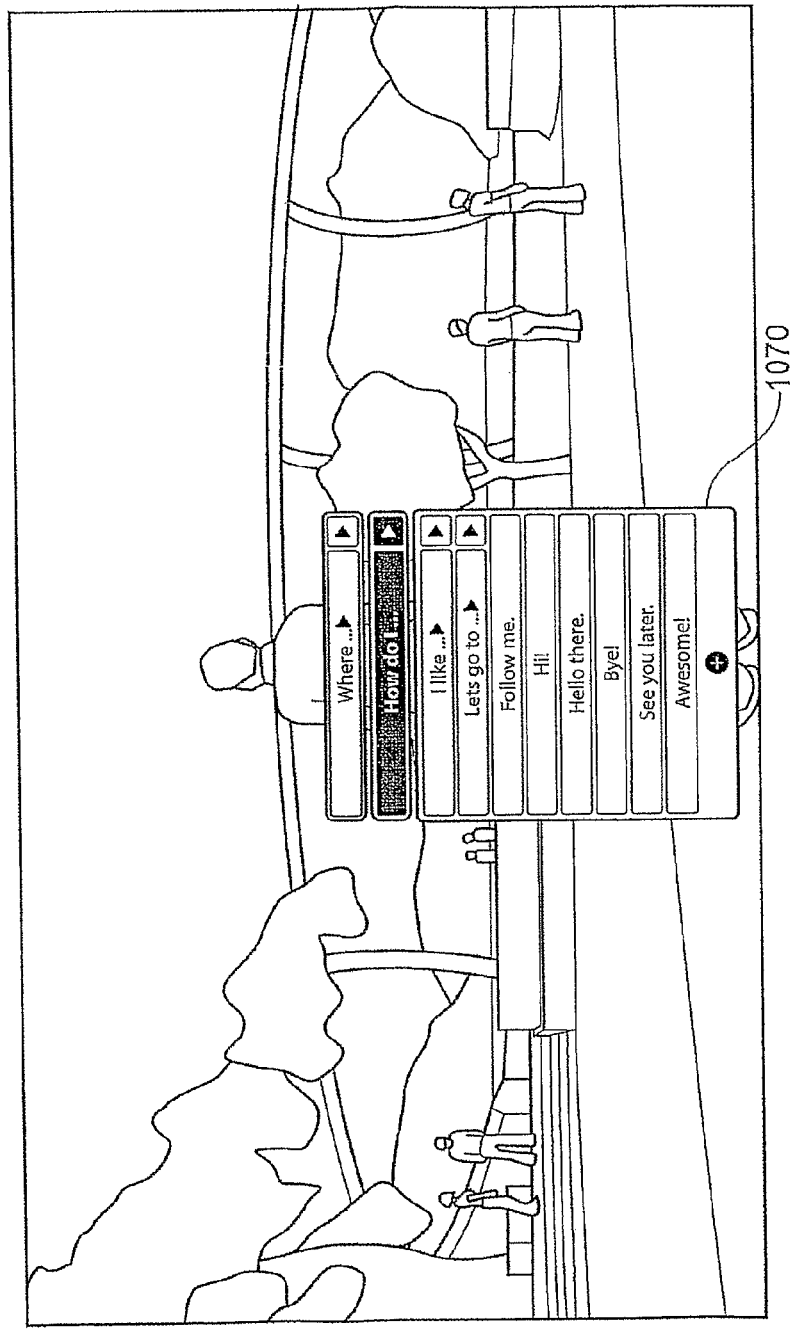
FIG. 9 is a schematic diagram of a communication menu in accordance with an embodiment of the present invention.

Referring now also to FIG. 9, to generate a message the user can activate a pop-up menu 1070 in which a range of preset messages is provided. These may be complete messages, or alternatively or in addition may take the form of nested menus, the navigation of which generates a message by concatenating selected options.

Alternatively or in addition, a virtual keyboard may be displayed, allowing free generation of text by navigation with the game controller 751. If a real keyboard 753 is connected via Bluetooth, then text may by typed into a bubble directly.

In an embodiment of the present invention, the lobby also provides a chat channel hosted by the Home environment server, enabling conventional chat facilities.

To communicate by speech, a user must have a microphone, such as a Bluetooth headset 757, available. Then in an embodiment of the present invention, either by selection of a speech option by pressing a button on the game controller 751, or by use of a voice activity detector within the software implementing the Home environment, the user can speak within the Home environment. When speaking, a speech icon may appear above the head of the avatar for example to alert other users to adjust volume settings if necessary.

The speech is sampled by the user's PS3, encoded using a Code Excited Linear Prediction (CELP) codec (or other known VoIP applicable codec), and transmitted in a peer-to-peer fashion to the eight nearest avatars (optionally provided they are within a preset area within the virtual environment surrounding the user's avatar). Where more than eight other avatars are within the preset area, one or more of the PS3s that received the speech may forward it to other PS3s having respective user avatars within the area that did not receive the speech, in an ad-hoc manner. To co-ordinate this function, in an embodiment of the present invention the PS3 will transmit a speech flag to all PS3s whose avatars are within the preset area, enabling them to place a speech icon above the relevant (speaking) avatars head (enabling their user to identify the speaker more easily) and also to notify the PS3s of a transmission. Each PS3 can determine from the relative positions of the avatars which ones will not receive the speech, and can elect to forward the speech to the PS3 of whichever avatar they are closest to within the virtual environment. Alternatively, the PS3s within the area can ping each other, and whichever PS3 has the lowest lag with a PS3 that has not received the speech can elect to forward it.

It will be appreciated that the limitation to eight is exemplary, and the actual number depends upon such factors as the speech compression ratio and the available bandwidth.

In an embodiment of the present invention, such speech can also be relayed to other networks, such as a mobile telephony network, upon specification of a mobile phone number. This may be achieved either by routing the speech via the Home environment server to a gateway server of the mobile network, or by Bluetooth transmission to the user's own mobile phone. In this latter case, the mobile phone may require middleware (e.g. a Java® applet) to interface with the PS3 and route the call.

Thus a user can contact a person on their phone from within the Home environment. In a similar manner, the user can also send a text message to a person on their mobile phone.

In a similar manner to speech, in an embodiment of the present invention users whose PS3s are equipped with a video camera such as the Sony® Eye Toy® video camera can use a video chat mode, for example via a pop-up screen, or via a TV or similar device within the Home environment, such as a Sony® Playstation Portable® (PSP) held by the avatar. In this case video codecs are used in addition to or instead of the audio codecs.

Optionally, the avatars of users with whom you have spoken recently can be highlighted, and those with whom you have spoken most may be highlighted more prominently, for example by an icon next to their name, or a level of glow around their avatar.

Referring back to FIG. 5, when a user selects to activate the Home environment on their PS3 10, the locally stored software generates the graphical representation of the Home environment, and connects to a Home environment server 2010 that assigns the user to one of a plurality of online Home environments 2021, 2022, 2023, 2024. Only four home environments are shown for clarity.

It will be understood that potentially many tens of thousands of users may be online at any one time. Consequently to prevent overcrowding, the Home environment server 2010 will support a large plurality of separate online Home environments. Likewise, there may be many separate Home environment servers, for example in different countries.

Once assigned to a Home environment, a PS3 initially uploads information regarding the appearance of the avatar, and then in an ongoing fashion provides the Home environment server with positional data for its own avatar, and receives from the Home environment server the positional data of the other avatars within that online Home environment. In practice this positional-update is periodic (for example every 2 seconds) to limit bandwidth, so other PS3s must interpolate movement. Such interpolation of character movement is well-known in on-line games. In addition, each update can provide a series of positions, improving the replication of movement (with some lag), or improving the extrapolation of current movement.

In addition the IP addresses of the other PS3s 2031, 2032, 2033 within that Home environment 2024 is shared so that they can transmit other data such as speech in a peer-to-peer fashion between themselves, thereby reducing the required bandwidth of data handled by the Home environment server.

To prevent overcrowding within the Home environments, each will support a maximum of, for example, 64 users.

The selection of a Home environment to which a user will be connected can take account of a number of factors, either supplied by the PS3 and/or known to the Home environment server via a registration process. These include but are not limited to:

i. The geographical location of the PS3;
ii. The user's preferred language;
iii. The user's age;
iv. Whether any users within the current user's 'friends list' are in a particular Home environment already;
v. What game disk is currently within the user's PS3;
vi. What games have recently been played on the user's PS3.

Thus, for example, a Swiss teenager may be connected to a Home environment on a Swiss server, with a maximum user age of 16 and a predominant language of French. In another example, a user with a copy of 'Revolution' mounted in their PS3 may be connected to a home environment where a predominant number of other users also currently have the same game mounted, thereby facilitating the organisation of multiplayer games. In this latter case, the PS3 10 detects the game loaded within the BD-ROM 430 and informs the Home environment server 2010. The server then chooses a Home environment accordingly.

In a further example, a user is connected to a Home environment in which three users identified on his friends list can be found. In this latter example, the friends list is a list of user names and optionally IP addresses that have been received from other users that the user given wishes to meet regularly. Where different groups of friends are located on different Home environment servers (e.g. where the current user is the only friend common to both sets) then the user may either be connected to the one with the most friends, or given the option to choose.

Conversely, a user may invite one or more friends to switch between Home environments and join them. In this case, the user can view their friends list via a pop-up menu or from within the Home environment (for example via a screen on the wall or an information booth) and determine who is on-line. The user may then broadcast an invite to their friends, either using a peer-to-peer connection or, if the friend is within a Home environment or the IP address is unknown, via the Home environment server. The friend can then accept or decline the invitation to join.

To facilitate invitation, generally a Home environment server will assign less than the maximum supported number of users to a specific home environment, thereby allowing such additional user-initiated assignments to occur. This so-called 'soft-limit' may, for example, be 90% of capacity, and may be adaptive, for example changing in the early evening or at weekends where people are more likely to meet up with friends on-line.

Where several friends are within the same Home environment, in an embodiment of the present invention the map screen may also highlight those zones in which the friends can currently be found, either by displaying their name on the map or in association with the zone name on the side bar.

Figure 10:
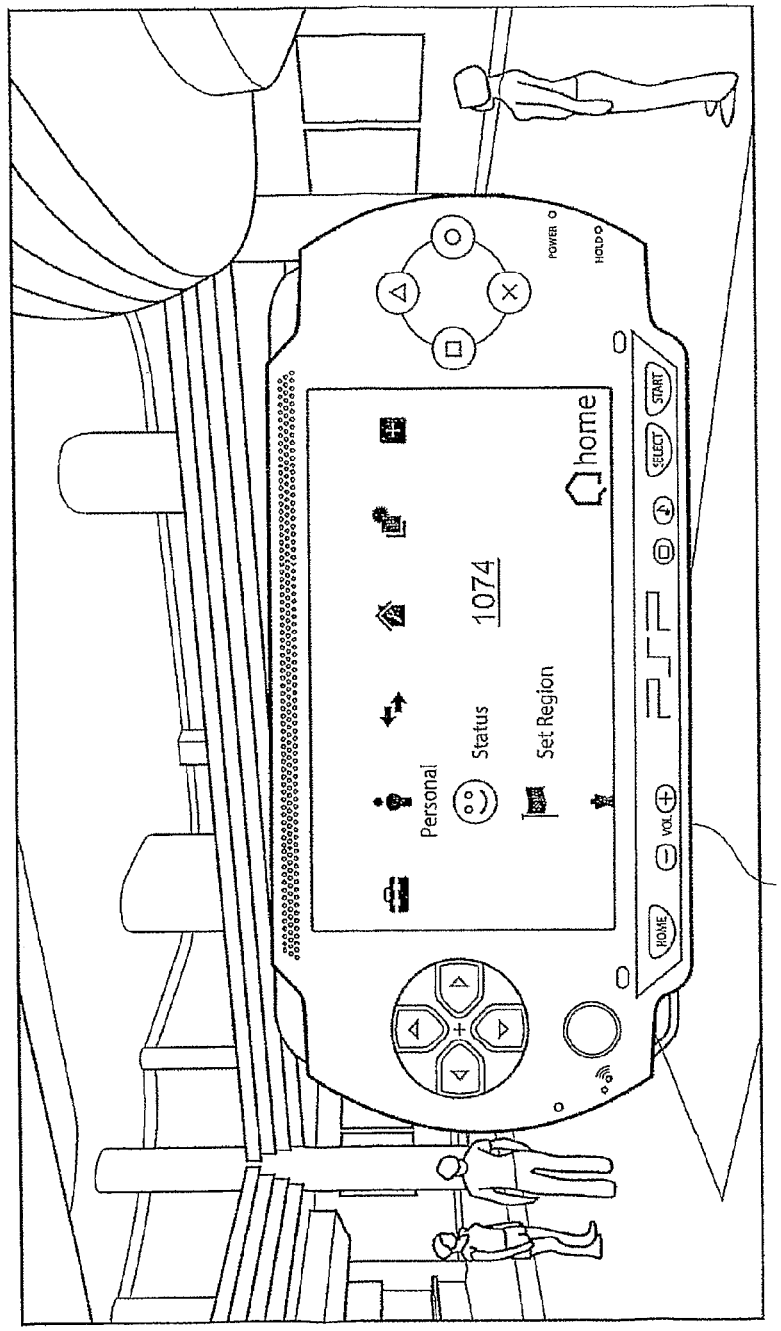
FIG. 10 is a schematic diagram of an interactive virtual user device in accordance with an embodiment of the present invention.

Referring now also to FIG. 10, in addition, preferences, settings, functions of the Home environment and optionally other functionality may be viewed, adjusted or accessed as appropriate by use of a virtual Sony® Playstation Portable® (PSP) entertainment device 1072 that can be summoned by use of the game controller 751 to pop-up on screen. The user can then access these options, settings and functionality via a PSP cross-media bar 1074 displayed on the virtual PSP. As noted above, the PSP could also be used as an interface for video chat.

When a user wishes to leave the Home environment, in embodiments of the present invention they may do so by selection of an appropriate key on the game controller 751, by selection of an exit option from a pop-up menu, by selection of an exit from within the map screen, by selection of an option via their virtual PSP or by walking through a master exit within the lobby zone.

Typically, exiting the Home environment will cause the PS3 10 to return to the PS3 cross media bar.

Finally, it will be appreciated that additional, separate environments based upon the Home environment software and separately accessible from the PS3 cross-media bar are envisaged. For example, a supermarket may provide a free disk upon which a Supermarket environment, supported in similar fashion by the Home environment servers, is provided. Upon selection, the user's avatar can browse displayed goods within a virtual rendition of the supermarket (either as 3D models or textures applied to shelves) and click on them to purchase as described above. In this way retailers can provide and update online shopping facilities for their own user base.

Figure 11:
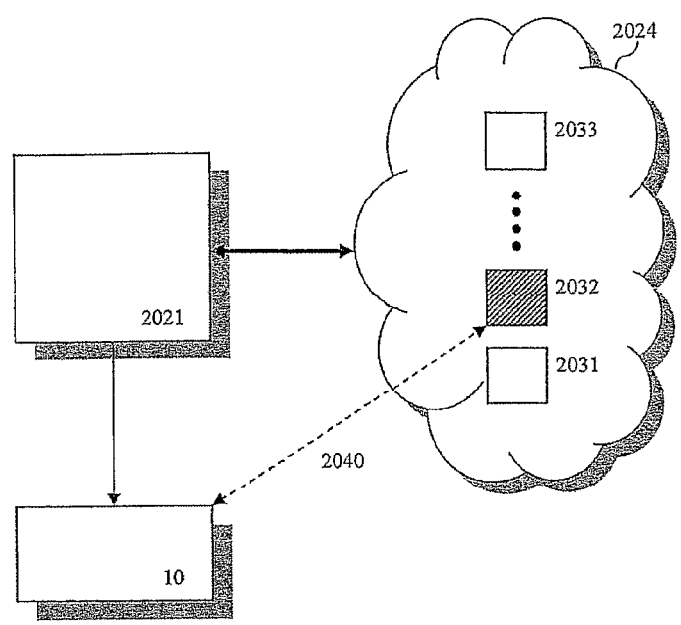
FIG. 11 is a schematic diagram of a Home environment online client/server arrangement in accordance with an embodiment of the present invention.

Referring now to FIG. 11, in an embodiment of the present invention an on-line system comprises the PS3 10 coupled to the Home environment server 2010, along with a plurality of other user's PS3s 2031, 2032, 2033 who together all interact with an instance of the Home environment 2024. By way of example, in FIG. 11 one of the other users of an entertainment device 2032 has customised his avatar to wear a T-shirt carrying an image, by importing the image as a texture for the T-shirt. As noted above, when a PS3 is assigned to an instance of the Home environment, it initially uploads information regarding the appearance of that PS3 user's avatar to the server 2010. When the avatar has been customised in this fashion, this includes the texture or textures used in any customisation. In the present example this will be the texture applied to the T-shirt. This texture is then distributed by the server to the other PS3s in the same instance of the Home environment, so that the rest of the users can see it when the relevant user's avatar is rendered in the environment on their display. Alternatively, textures could be distributed via a peer to peer link 2040.

For the purposes of example, in this case the other user has customised their avatar's T-shirt to show an offensive image. Such behaviour is hard to automatically detect (unlike offensive language in a typed discourse) and so is likely to be distributed as if it were any other customisation. However, when the user of a first PS3⁻ 10 encounters the customised avatar within the Home environment, she may find the image on the avatar's T-shirt offensive. In response, as an example she uses a text bubble to tell the user of the customised avatar that she'd like that user to remove the image. In response, the user of the customised image uses the peer-to-peer speech facility described above to shout abusive language at the user of the first PS3 10.

In an embodiment of the present invention, the user of the first PS3 10 can press an assigned button on her game controller 751 that will instigate a grief report process. Alternatively, the button brings up a menu that allows access to the grief reporting process.

As in prior art systems, the user can be provided with a form in which she can include details of the incident according to her opinion. This form can be assisted automatically by providing the aliases of all avatars within the zone, or alternatively those avatars within a certain radius of the user's own position in the virtual environment, and/or all avatars with which the user has communicated recently (irrespective of whether they are still in that zone), enabling a more accurate reporting by the user. This list of aliases can be sorted in a variety of ways, such as alphabetically, by time of interaction or by proximity.

However, in the above example a form cannot substantiate the accusations that the user is making, because the T-shirt design may not be verifiable by the time that the grief report is reviewed by an administrator of the Home environment, and of course the peer-to-peer chat bypasses the Home environment server entirely and cannot be independently verified by an administrator.

Consequently, in an embodiment of the present invention the grief reporting system conducts a forensic sweep of the virtual environment for content that originated with other users and was received either via the Home environment server or via a peer-to-peer connection, and collates this content or evidence of it into an augmented grief report.

This forensic sweep can take a number of forms. In one embodiment, when pressing the button to instigate a grief report (or summon the menu that allows access to the grief report), the PS3 freezes the current state of its representation of the virtual environment and generates a substantially 360 degree lateral snapshot of the virtual environment with respect to the notional viewpoint or position of the user who initiated the report. This accounts for the possibility that the user has turned away from the offensive image before making the report, or that the other user's avatar has walked out of view to the right of left. Optionally, the snapshot is watermarked, incorporating a time stamp and other details such as user ID or PS3 serial numbers, to limit the creation of spoof reports. The field of view of such a snapshot may vary depending upon the environment or the preferences of the environment's administrators. For example it may be a hemispherical image roughly centred on the reporting user's position, or even a spherical image, for example if the user is above a notional ground level in the environment. Generally, the snapshot may encompass any direction in which user originated content may visible from the position of the user. In a simpler embodiment, a screenshot of the display as seen by the user at the moment they initiated the report may be used.

Alternatively or in addition, as noted above the PS3 identifies all the content that originated with other users and that is temporarily stored by the PS3 for use in that on-line session of the Home environment. To avoid involving unnecessary parties, and to limit the amount of data to be reviewed by an administrator, optionally only content associated with avatars or objects within a predetermined radius of the user may be identified on the assumption that a user will report a grievance quickly and that any items beyond a certain distance cannot be seen and so were unlikely to be the source of the grievance.

Alternatively or in addition, the PS3 tracks all the content that originated with other users and which is encountered by the user over a period of time leading up to the instigation of the grief report; e.g. user originated content that came within a specified distance of the user within the last 3 minutes (or some other period of time) prior to instigating the report. This can also be implemented as the last N user sourced assets encountered, where N is an empirically determined number. In either case such tracking data may be held in a rolling buffer at the PS3, and the identified contents or assets are collated from the PS3 memory or storage for inclusion as part of the grief report.

Where the user originated content was distributed by the Home environment server, in an embodiment of the present invention only content identifiers are included in the grief report in order to reduce report upload file sizes. Upon receipt by the Home environment server, the identified contents are then held by the server until an administrator can review the report. Such content identifiers may be appended to user-originated content when forwarded by the Home environment server, and may include details about the source user/machine, and/or session and instance details.

Alternatively or in addition, the PS3 can set aside space on its HDD 400 for a circular buffer, to which a recording of the output sent to the user's display and loudspeakers is recorded. This audio-video recording may represent, for example, the last 3 minutes of play prior to the instigation of the report process, with the recording stopping once the report is instigated. Optionally, the recording is watermarked, incorporating a time stamp and other details such as user ID or PS3 serial numbers, to limit the creation of spoof reports. Optionally the recording is at a lower resolution than the originally displayed images.

Such a recording captures ephemeral abuse such as that delivered by a peer-to-peer audio link, and may also help to determine the extent to which the reporting user contributed to any abusive situation, or any other mitigating factors in defence of the alleged abuser. Optionally, the reporting user can review the video and select only a relevant portion for transmission. It will be appreciated that a circular buffer can be any arrangement of a storage area or areas where earlier data is eventually overwritten by later data in an ongoing fashion.

In a similar manner, alternatively only the audio may be recorded in such a circular buffer. This would typically require a much smaller circular buffer for a similar period of coverage.

In either case, preferably the audio streams received by the reporting user's PS3 and included in the audio heard by that user are recorded separately and/or are associated with data identifying the originator(s) of the audio.

Alternatively or in addition, a full or partial copy of the user's chat log (e.g. a record of text chat involving the user) can be included in the report.

If the user decides to complete the grief report and submit it, the evidence as collated in one or more of the above described embodiments is incorporated within the report and transmitted to the Home environment server, where it awaits review by an administrator.

The grief report may automatically incorporate one or more selected from the list consisting of
  i. date and time stamps;
  ii. zone and instance identification data;
  iii. a log of text communication involving the reporting user;
  iv. PS3 IP address data (for the user making the grief report and optionally also the PS3s of the one or more avatars within a predetermined radius of the user within the Home environment or with which a peer-to-peer connection is or has been recently active);
  v. PS3 hardware identification data;
  vi. identification data for all other users in the zone, including proximity to the reporting user, and optionally identification data for other users who have left the reporting user's zone within a predetermined period preceding the report;
  vii. identification data for other users with whom the reporting user has interacted within a predetermined period preceding the report;
  viii. user identification data;
  ix. user language preference data; and x. user avatar appearance data and/or user profile data (this may be relevant to determining whether abuse has a religious or racist intent).

The assigned button on the user's game controller 751 may be described as a 'panic button', and in an embodiment of the present invention causes the current view of the online environment to be obscured (e.g. blurred) and/or replaced with a menu screen, thereby immediately removing from view any offensive material. Optionally the user may also effectively be suspended from the Home environment for the period that they are within the menu/report, thereby also preventing any further audio or other communications (such as in pop-up windows) being received. Consequently their avatar may disappear from other user's view, or a message such as 'paused' may appear above their avatar, in response to a signal sent by their PS3 to the Home environment server.

The menu summoned by the panic button provides the option of submitting a grief report. Optionally, it may also provide other less drastic mechanisms by which the user can avoid the current abusive situation, since not all circumstances may warrant the submission of a grief report. These other means may include an option to mute or ignore another user within the user's own representation of the Home environment, so that no text is displayed in any speech bubble they use, and/or no audio is relayed from them, and/or any customisations to the avatar are replaced with in-game defaults. This allows a user to effectively ignore the output of another user whilst leaving other users unaffected.

Another option is to randomly teleport to another position within the Home environment, thereby avoiding the abusive user (a check is made that the random selection does not reposition the user back near her current position). This may be of help where an abusive user or users are trying to block someone off or are constantly harassing them. Instead of a random location, the user could be teleported to their private apartment zone, or offered a list of zones to choose from.

Another option is to switch to a different instance of the Home environment altogether—this may be useful if the general tone or atmosphere of a particular instance of the Home environment is not to the user's liking. Optionally, the abusive user can be blacklisted by the current user, so that in future the current user is never spawned into an instance of the Home Environment containing the abusive user. Such a blacklist may comprise user alias/device IP address data and be maintained by the Home environment server for each user or may be transmitted from a user's PS3 as part of the login process.

A final option is to quit Home entirely and return to the PS3 cross-media bar. In an embodiment of the present invention, the grief report process may be deliberately onerous, for example requiring the entry of a number of details by the user, or the addition of progress bars or other delays, which serve to discourage the submission of grief reports for frivolous reasons.

During the grief reporting process, to facilitate effective review by the administrators, the reporting user may be required to categorise the nature of the abuse they are reporting by user of a drop-down menu or other option selection interface. The types of abuse categorised may include; the use of pornographic or obscene material, offensive behaviour, displays of graphic violence, mature content in an age-restricted zone, hate speech, illegal acts or the promotion or condoning of same, the broadcast of personal information such as phone numbers or email addresses, spamming, breach of copyright, or any other breach of the terms and conditions of use.

A confirmation screen may be provided at the end of the grief reporting process, summarising the grief report and confirming that it has been sent. It may also give an indication of whether or not the reporting user can expect to be contacted by an administrator.

In an embodiment of the present invention, once the grief report is complete the user is again offered the mechanisms outlined above to avoid the abusive situation, so that they need not return to the abusive situation upon leaving the reporting process.

Figure 12:
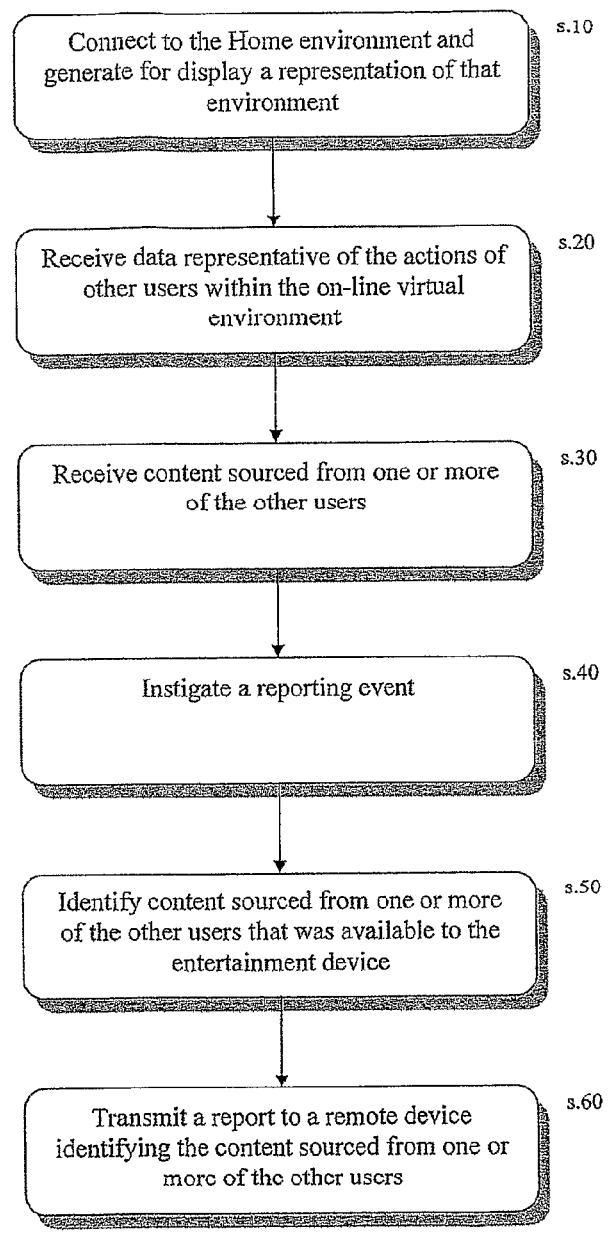
FIG. 12 is a flow diagram of a method of on-line reporting in accordance with an embodiment of the present invention.

Referring now to FIG. 12, a method of on-line reporting comprises:

in a first step, connecting (s.10) to the online virtual environment and generating a representation of it for display to the user;

in a second step, receiving (s.20) data representative of the actions of other users within the on-line virtual environment;

in a third step, receiving (s.30) content sourced from one or more of the other users of the one or more remote entertainment devices occupying the same online virtual environment;

in a fourth step, instigating (s.40) a reporting event;

in a fifth step, identifying (s.50) content sourced from one or more of the other users of the one or more remote entertainment devices occupying the same online virtual environment and that was available to the entertainment device when the reporting event was instigated; and in a sixth step, transmitting (s.60) a report to a remote device identifying content sourced from one or more of the other users of the one or more remote entertainment devices occupying the same online virtual environment.

It will be appreciated that the above steps need not necessarily all be in the described order; for example, customisation content may be received before generating a representation of the virtual environment.

It will also be appreciated by a person skilled in the art that variations in the above method corresponding to operation of the various embodiments of the apparatus disclosed above are to be considered within the scope of the present invention, including but no limited to:

the user submitting details themselves via a form;
the content being gathered by generating a 360° view;
the content being identified as all user-sourced material within a given radius of the user at the time of the report;
the content being identified as all user-sourced material encountered within a given radius of the user within a predetermined time period preceding the report;
the content being gathered by reference to a recording of the user's experience;
reporting such content by means of a content reference or ID number where applicable;
reporting such content by uploading it to a server (e.g. the Home environment server, or a dedicated reporting server); and
providing alternatives to filing a grief report such as muting another user or teleporting away from them.

It will be appreciated that embodiments of the present invention may be implemented in any suitable manner. In particular it may comprise implementing an embodiment by software reconfiguration of one or more processors within an entertainment device or server. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

The invention claimed is:

1. An entertainment device, comprising:
   a display generator arranged to generate for display a representation of an on-line virtual environment comprising one or more avatars corresponding to users of one or more remote entertainment devices each interacting with that online virtual environment;
   a network communicator operable to receive data representative of the actions of other users within the on-line virtual environment, and to receive content sourced from one or more users of the one or more remote entertainment devices interacting with that online virtual environment;
   an input device operable by the user to instigate a reporting event;
   a content identifier operable to generate information indicative of content sourced from one or more users of the one or more remote entertainment devices and that was available to the entertainment device when the reporting event was instigated; in which the content identifier is operable to generate a report containing a substantially 360 degree lateral view with respect to the user's viewpoint in the virtual environment when the reporting event was instigated, as part of the generated information, wherein the substantially 360 degree lateral view is a snapshot that freezes a current state of the online virtual environment, the snapshot watermarked to incorporate time stamp information and at least one of identification data for the entertainment device and user identification data, thereby limiting the creation of spoof reports; and
   the network communicator is operable to transmit the report containing the watermarked snapshot incorporating the time stamp information and at least one of the identification data for the entertainment device and the user identification data to a remote device.

2. An entertainment device according to claim 1, in which the content identifier is further operable to collate all content received from one or more users of the one or more remote entertainment devices that was embodied within the virtual environment up to a predetermined distance from the user's position in the virtual environment when the reporting event was instigated.

3. An entertainment device according to claim 1, in which the content identifier is further operable to collate all content received from one or more users of the one or more remote entertainment devices that was embodied within the virtual environment up to a predetermined distance from the user's position in the virtual environment during a predetermined time period preceding the instigation of the reporting event.

4. An entertainment device according to claim 1, in which
   the entertainment device comprises a circular buffer, and the entertainment device is operable to record a video of the viewpoint displayed to the user of the entertainment device to the circular buffer, the recording being suspended upon instigation of a reporting event; and
   the content identifier is operable to incorporate some or all of the video in the circular buffer within the report.

5. An entertainment device according to claim 1, in which the network communicator is operable to transmit a report to a remote device comprising content sourced from one or more users.

6. An entertainment device according to claim 1, in which the network communicator is operable to transmit a report to a remote device comprising content identification codes for content sourced from one or more users that was originally distributed via that remote device.

7. An entertainment device according to claim 1, in which the network communicator is operable to transmit the report to a remote device further comprising one or more selected from the list consisting of:
   i. location data;
   ii. a log of text communication involving the reporting user;
   iii. identification data for an entertainment device from which content was sourced;
   iv. reporting user avatar appearance data;
   v. reporting user profile data; and
   vi. other user identification data.

8. An entertainment device according to claim 1, comprising
   a user interface generator;
   in which:
   the network communicator is operable to transmit a request to an administrating server to switch connection to a different instance of the virtual environment, and
   the user interface generator generates a user interface that provides the user of the entertainment device with the option to switch to a different instance of the virtual environment.

9. An entertainment device according to claim 1, comprising a user interface generator operable to generate a report form in which the user can submit written details about the circumstances leading to the instigation of a reporting event.

10. A method of on-line reporting, comprising the steps of:
    connecting to an online virtual environment and generating a representation of it for display to a user;
    receiving data representative of the actions of other users within the on-line virtual environment;
    receiving content sourced from one or more of the other users of the one or more remote entertainment devices interacting with that online virtual environment;
    instigating a reporting event;
    generating information indicative of the content sourced from one or more of the other users of the one or more remote entertainment devices and that was available to the entertainment device when the reporting event was instigated; and
    wherein generating the information indicative of the content comprises generating a report containing a substantially 360 degree lateral view with respect to the user's position in the virtual environment when the reporting event was instigated, the substantially 360 degree lateral view being a snapshot that freezes a current state of the online virtual environment, the snapshot watermarked to incorporate time stamp information and at least one of identification data for the entertainment device and user identification data, thereby limiting the creation of spoof reports; and
    transmitting, to a remote device, the report containing the watermarked snapshot incorporating the time stamp information and at least one of the identification data for the entertainment device and the user identification data.

11. A method according to claim 10 in which generating the information indicative of the content further comprises collating all content received from one or more users of the one or more remote entertainment devices that was embodied within the virtual environment up to a predetermined distance from the user's position in the virtual environment when the reporting event was instigated.

12. A method according to claim 10 in which generating the information indicative of the content comprises collating all content received from one or more users of the one or more remote entertainment devices that was embodied within the virtual environment up to a predetermined distance from the user's position in the virtual environment during a predetermined time period preceding the instigation of the reporting event.

13. A method according to claim 10, comprising the steps of: recording a video of the viewpoint displayed to the user of the entertainment device to a circular buffer, the recording being suspended upon instigation of a reporting event; and incorporating some or all of the video in the circular buffer within the report.

14. A method according to claim 10, in which the step of transmitting a report comprises transmitting a report to a remote device comprising content identification codes for content sourced from one or more users that was originally distributed via that remote device.

15. A method according to claim 10 in which the step of transmitting the report further comprises transmitting one or more selected from the list consisting of:
   i. location data;
   ii. a log of text communication involving the reporting user;
   iii. identification data for an entertainment device from which content was sourced;
   iv. reporting user avatar appearance data;
   v. reporting user profile data; and
   vi. other user identification data.

16. A tangible, non-transitory computer-readable program product comprising a recording medium for storing a program, the program, when executed by a processor, causing the processor to perform a method of on-line reporting, the method comprising:
   connecting to an online virtual environment and generating a representation of it for display to a user;
   receiving data representative of the actions of other users within the on-line virtual environment;
   receiving content sourced from one or more of the other users of the one or more remote entertainment devices interacting with that online virtual environment;
   instigating a reporting event;
   generating information indicative of the content sourced from one or more of the other users of the one or more remote entertainment devices and that was available to the entertainment device when the reporting event was instigated;
   wherein generating the information indicative of the content comprises generating a report containing a substantially 360 degree lateral view with respect to the user's position in the virtual environment when the reporting event was instigated, the substantially 360 degree lateral view being a snapshot that freezes a current state of the online virtual environment, the snapshot watermarked to incorporate time stamp information and at least one of identification data for the entertainment device and user identification data, thereby limiting the creation of spoof reports; and
   transmitting, to a remote device, the report containing the watermarked snapshot incorporating the time stamp information and at least one of the identification data for the entertainment device and the user identification data.

* * * * *